Oct. 22, 1929.       F. B. KNIGHT            1,732,815
                  EDUCATIONAL DEVICE
                  Filed May 10, 1928        2 Sheets-Sheet 1

Oct. 22, 1929.　　F. B. KNIGHT　　1,732,815
EDUCATIONAL DEVICE
Filed May 10, 1928　　2 Sheets-Sheet 2

*Fig. 6*

| 1. (Printed Question) |
| 1. (Pupils Answer) |
| 2. (Printed Question) |

| 5. (Printed Question) |
| 5. (Pupils Answer) |
| 6. (Printed Question) |
| 6. (Pupils Answer) |
| 6 (Printed Answer) |

*Fig. 7*

| 1. |
| 1. |
| 2. |

| 5. |
| 5. |
| 6. (Printed Question) |
| 6. (Pupils Second Trial) |

*Fig. 8*

| 1.(Printed Question) | 1.(Pupils Answer) | 2.(Pupils Answer) | 2.(Printed Question) |
|---|---|---|---|
| 3. | 3. | 4. | 4. |
| 5. | 5. | 6. | 6. |
| 7. | 7. | 8. | 8. |
| 15. | 15. | 16. | 16. |
| 17. | 17. | 18. | 18. |

*Fig. 9*

| 1.(Printed Answer) | 1.(Pupils Second Trial) | 2.(Pupils Second Trial) | 2.(Printed Answer) |
|---|---|---|---|
| 3. | 3. | 4. | 4. |
| 5. | 5. | 6. | 6. |
| 7. | 7. | 8. | 8. |
| 15. | 15. | 16. | 16. |
| 17. | 17. | 18. | 18. |

*Fig. 10*

| 1.(Printed Question) | 1.(Pupils Answer) | 1.(Printed Answer) |
|---|---|---|
| 3. | 3. | 3. |
| 5. | 5. | 5. |
| 7. | 7. | 7. |
| 15. | 15. | 15. |
| 17. | 17. | 17. |

Inventor:
Frederic B. Knight

Patented Oct. 22, 1929

1,732,815

UNITED STATES PATENT OFFICE

FREDERIC B. KNIGHT, OF IOWA CITY, IOWA

EDUCATIONAL DEVICE

Application filed May 10, 1928. Serial No. 276,792.

This invention relates to improvements in educational devices, and more especially to such a device adapted for use in learning, correcting, drilling or testing as used in any phase of learning. My invention may also be used in connection with games of the educational variety, or games played purely for amusement.

By the use of my invention questions may be submitted to a pupil on a sheet of paper having the correct answers on the reverse side hidden from view. Space may be provided on the face of the paper, if desired, for the pupil to write his answer to the question. The questions and answers are so arranged on the paper that, by folding the same up progressively from one edge toward the other, the correct answers to the questions may be brought adjacent said questions seriatim. In using the term "question", it is to be understood that I mean to include words, pictures, maps, exercises, problems (mathematical and otherwise), puzzles, and the like. By the term "answer" I mean to include explanations, translations, solutions, comments, criticisms and the like.

By the use of my invention there is a saving of time and lessening of eye strain in connection with the answering of questions and the correcting of such answers. It is possible for a pupil to write his answer directly on the question sheet in close proximity to the question itself thus eliminating the errors that might occur if the pupil is forced to copy the question on a separate sheet. In correcting the answer, also, there is no time lost in determining which question the answer relates to. The numbering of questions and answers is also eliminated. The correcting of the answers is also very quickly and easily effected with a high degree of accuracy since by simple manipulation the correct answer is easily brought to a position adjacent the question so that the pupil's answer can readily be compared therewith. The question, the pupil's answer and the correct answer are all in close proximity and visible at the same time.

Another feature of my invention is the provision of means for giving the pupil a second or third trial or more, to get the correct answer.

It is to be noted also that the correct answers on the printed sheet are upside down on the reverse side thus reducing to a minimum the possibility for the pupil to see the answer through the sheet as he writes his answers.

Other features and advantages of my invention will appear more fully as I proceed with my specification.

In those forms of devices embodying the features of my invention shown in the accompanying drawings, Figure 1 is a view of the face of a question sheet, Fig. 2 is a view of the reverse side thereof, and Fig. 3 is a view similar to Fig. 1 showing the paper partly folded. Fig. 4 is a view of the face of a modified form of the question sheet, Fig. 5 is a view of the reverse side thereof and Figs. 6 and 7 are the views similar to Fig. 4 showing the sheet folded. Fig. 8 is a view of the face of a modified form of the question sheet, Fig. 9 is a view of the reverse side thereof and Fig. 10 is a view similar to Fig. 8 showing the sheet folded.

I shall first describe the device shown in Figs. 1, 2 and 3. As here shown, 10 indicates the face of a sheet of paper of any shape, here shown as rectangular, and $10^a$ indicates the reverse side thereof. Arranged on the face of the paper, preferably in horizontal lines, are questions or series of questions. As here shown, these questions comprise German words to be translated. For example, I have here shown four German words on each line, such words being indicated by 11, 11. I preferably number these words, and below each word leave a space for the pupil to write the answer, such answer in this case consisting of the translation of the German word. Under each row of questions or words to be translated, I preferably provide on the sheet of paper a line 12 indicating where the paper is to be folded. This line may comprise merely a mark, or it may consist of a crease, row of perforations, or other means assisting the pupil to fold the paper on the line. It is to be noted, that the lines 12, 12 are arranged progressively closer together from the top toward the bottom of the paper. This is to permit the paper to be folded on such lines progressively upwardly from the bottom toward the top. Or, it might be stated that the paper is "rolled" up from the bottom by folding the same upwardly progressively on the lines 12, 12. It is to be understood, however, that preferably a round roll is not made. After each fold, the paper should lie more or less flat.

On the reverse side of the sheet the answers, or, in this case, the translations of the words on the face of the sheet are printed upside down. In the use of the invention, the pupil may write the translations of the words in the blank spaces under such words. For example, as shown in Fig. 3 the translations of the words numbered 45, 46, 47 and 48 are written under the same. After the translations have been written, their correctness is determined by folding up the lower edge of the paper as indicated by 13, on the lowest fold mark as indicated by 12$^a$. This brings the correct translations directly under the translations written by the pupil as shown in Fig. 3, so that comparison can be very easily made. Likewise, in order to test the correctness of the translations of words 41 to 44 inclusive, the bottom of the paper is again folded upwardly on the next crease mark as indicated by 12$^b$. This will cover the words 45 to 48 inclusive with their answers and bring the correct translations for the words 41 to 44 inclusive directly underneath. In this manner, the sheet is folded, or "rolled" upwardly from the bottom so that the correct answers for each row of questions are brought adjacent such questions seriatim.

I shall now describe the form of device shown in Figs. 4, 5, 6 and 7. This device is very similar to the one shown in Figs. 1, 2 and 3 except that in the form here shown, the pupil is given a second trial. This is accomplished by providing an additional fold mark between the question and the space provided for the pupil's answer. In the device shown in Figs. 4 to 7 inclusive, 110 indicates the face of the sheet and 110$^a$ the reverse side thereof. The crease marks resembling the marks 12, 12$^a$ and 12$^b$ of the forms shown in Figs. 1 to 3 inclusive are here indicated by 112, 112$^a$ and 112$^b$. As here shown, for example, number 6 is an algebraic question. A fold line 112$^a$ is provided directly under this question. Below this fold line is provided a space 113 for the pupil's answer. On the reverse side appears the correct answer. In the use of the invention, for example, the pupil may first place an incorrect answer as shown in Fig. 6 where he has stated that X equals 21. In testing the answer the first upward fold is made as shown in Fig. 6 showing that the correct answer is 9. The paper may then be given another fold upwardly as shown in Fig. 7 bringing to view the space for the pupil's second trial.

I shall now describe the form of device shown in Figs. 8, 9 and 10. As here shown, the face of the paper is indicated by 210 and the reverse side by 210$^a$. This device resembles in general the device shown in the other figures except that the fold lines are vertical as indicated by 212, instead of horizontal.

As shown in Fig. 8, the questions on the face may be arranged in two vertical columns at the edges of the sheet with two columns between for the pupil's responses. The answers are printed on the reverse side, as shown in Fig. 9. In the use of the invention the sheet is folded from the right-hand edge in working on the questions in the left-hand corner. The first fold, as shown in Fig. 10, brings the answers in view and the second fold provides a column for second trials. In working on the questions in the right-hand corner the sheet is similarly folded up from the left to the right.

What I claim is new, and desire to secure by Letters Patent, is:

1. In a device of the character described, a sheet of paper having a row of spaced questions on the face thereof and a similar row of answers on the reverse side, said questions and corresponding answers being offset longitudinally from each other, whereby the sheet may be folded progressively from one edge to bring the answers adjacent the corresponding questions seriatim.

2. A device as claimed in claim 1 with fold lines between the questions to assist in folding the sheet.

3. A device as claimed in claim 1 having on the face thereof a space adjacent each question in which an answer may be written.

4. A device as claimed in claim 1 having on the face thereof a space adjacent each question in which an answer may be written, and on the reverse side thereof a space adjacent each answer for a second trial.

5. In a device of the character described, a sheet of paper having a row of spaced questions on the face thereof and a similar row of answers on the reverse side, said questions and answers being offset longitudinally from each other a distance substantially the same as twice the distance between adjacent questions, whereby the sheet may be folded progressively from one edge to bring the answers adjacent the corresponding questions seriatim.

6. A device as claimed in claim 5 with fold lines between the questions to assist in folding the sheet.

7. A device as claimed in claim 5 having on the face thereof a portion left blank adjacent each question in which an answer may be written.

In witness whereof, I have hereunto set my hand this 3d day of May, 1928.

FREDERIC B. KNIGHT.